(12) United States Patent
Mukherjee et al.

(10) Patent No.: US 12,120,228 B2
(45) Date of Patent: *Oct. 15, 2024

(54) SYSTEMS AND METHODS USING DISTRIBUTED LEDGERS TO CORRECT FOR MISSING ONE TIME PASSWORDS IN EVENT PROCESSING

(71) Applicant: Bank of America Corporation, Charlotte, NC (US)

(72) Inventors: Maharaj Mukherjee, Poughkeepsie, NY (US); Prashant Thakur, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,981

(22) Filed: Sep. 12, 2023

(65) Prior Publication Data

US 2023/0421369 A1  Dec. 28, 2023

Related U.S. Application Data

(63) Continuation of application No. 17/141,563, filed on Jan. 5, 2021, now Pat. No. 11,799,639.

(51) Int. Cl.
*H04L 9/08* (2006.01)
*G06Q 20/38* (2012.01)
(Continued)

(52) U.S. Cl.
CPC ....... *H04L 9/0863* (2013.01); *G06Q 20/3821* (2013.01); *G06Q 20/401* (2013.01); *H04L 9/3228* (2013.01); *H04L 9/50* (2022.05)

(58) Field of Classification Search
None
See application file for complete search history.

(56) References Cited

U.S. PATENT DOCUMENTS 9,853,977 B1   12/2017  Laucius et al.
9,912,659 B1   3/2018   Widdows
(Continued)

OTHER PUBLICATIONS

Jun. 22, 2023—(US) Notice of Allowance—U.S. Appl. No. 17/141,563.
(Continued)

*Primary Examiner* — Scott S Trotter
*Assistant Examiner* — Amit Patel
(74) *Attorney, Agent, or Firm* — Banner & Witcoff, Ltd.

(57) ABSTRACT

Aspects of the disclosure relate to distributed ledgers in OTP verification. A computing platform may receive an event processing request. The computing platform may generate a one time password, and record the one time password in a distributed ledger, and send the one time password to a first device. The computing platform may receive, from a second device, the one time password, which may have been sent from the first device to the second device. Using the distributed ledger, the computing platform may validate the one time password, and may record, in the distributed ledger, validation information indicating that the first one time password was validated. Based on validating the first one time password using the distributed ledger, the computing platform may process a requested event, and may notify the second device that the event was processed.

20 Claims, 9 Drawing Sheets

(51) Int. Cl.
 *G06Q 20/40* (2012.01)
 *H04L 9/00* (2022.01)
 *H04L 9/32* (2006.01)

(56) References Cited

U.S. PATENT DOCUMENTS

| | | | |
|---|---|---|---|
| 9,935,772 | B1 | 4/2018 | Madisetti et al. |
| 9,942,231 | B1 | 4/2018 | Laucius et al. |
| 10,063,548 | B1 | 8/2018 | Laucius et al. |
| 10,091,180 | B1 | 10/2018 | Moritz et al. |
| 10,095,549 | B1 | 10/2018 | Needham et al. |
| 10,142,330 | B2 | 11/2018 | Widdows |
| 10,454,918 | B1 | 10/2019 | Uhr et al. |
| 10,476,879 | B2 | 11/2019 | Bathen et al. |
| 10,484,376 | B1 | 11/2019 | Laucius et al. |
| 10,505,738 | B1 | 12/2019 | Rule et al. |
| 10,541,991 | B2 | 1/2020 | Uhr et al. |
| 10,628,566 | B2 | 4/2020 | Hoffmann et al. |
| 10,659,434 | B1 | 5/2020 | Kim et al. |
| 10,659,462 | B1 | 5/2020 | Kim et al. |
| 10,664,577 | B2 | 5/2020 | Hoffmann et al. |
| 10,693,633 | B2 | 6/2020 | Kumar et al. |
| 10,693,872 | B1 | 6/2020 | Larson et al. |
| 10,708,251 | B2 | 7/2020 | Steiner |
| 10,749,865 | B2 | 8/2020 | Andrade |
| 10,756,906 | B2 | 8/2020 | Toth |
| 10,771,459 | B2 | 9/2020 | Kim et al. |
| 10,778,678 | B2 | 9/2020 | Song et al. |
| 10,778,682 | B1 | 9/2020 | Laucius et al. |
| 10,790,976 | B1 | 9/2020 | Raevsky et al. |
| 10,796,330 | B2 | 10/2020 | Licht et al. |
| 10,798,094 | B2 | 10/2020 | Wei |
| 10,819,503 | B2 | 10/2020 | Nandakumar et al. |
| 10,824,751 | B1 | 11/2020 | Kurian |
| 10,833,869 | B2 | 11/2020 | Dickenson et al. |
| 10,878,074 | B2 | 12/2020 | Wang et al. |
| 11,171,781 | B2 * | 11/2021 | Khan ............... H04L 9/0869 |
| 2019/0281053 | A1 | 9/2019 | Brown et al. |
| 2020/0058021 | A1 | 2/2020 | Mittal et al. |

OTHER PUBLICATIONS

Jan. 26, 2023—(US) Office Action—U.S. Appl. No. 17/141,563.
Jul. 22, 2022—(US) Office Action—U.S. Appl. No. 17/141,563.

* cited by examiner

405

Mobile Banking Interface

Please enter the one-time password that you received to confirm your transaction.

Event Processing Interface

Congratulations – your transaction has been approved and processed!

FIG. 5

SYSTEMS AND METHODS USING DISTRIBUTED LEDGERS TO CORRECT FOR MISSING ONE TIME PASSWORDS IN EVENT PROCESSING

CROSS-REFERENCE TO RELATED APPLICATIONS

This application is a Continuation application of U.S. Ser. No. 17/141,563, filed Jan. 5, 2021, and entitled "Systems and Methods Using Distributed Ledgers to Correct for Missing One Time Passwords in Event Processing," which is incorporated by reference herein in its entirety.

BACKGROUND

Aspects of the disclosure relate to distributed ledgers and event processing. In particular, one or more aspects of the disclosure relate to location analysis and service selection for mobile applications.

In some cases, enterprise organizations may use one time passwords (OTPs) for enhanced security. In some instances, however, OTPs might not be received by an individual prior to their expiration. In these instances, the OTP recipient may ultimately provide an expired OTP (though the OTP recipient believes the expired OTP to be valid). In these instances, the OTP may be processed as invalid. This problem may be further exacerbated when multiple OTPs are sent to the same individual (e.g., because a single OTP may be valid at a time). If the OTP is unable to be validated (e.g., due to expiration), individuals may experience difficulties in processing events (e.g., conducting transactions) for which the OTP is required for authentication. This may result in a negative experience for anyone involved in processing the event (e.g., customers, merchants, financial institutions, or other parties).

SUMMARY

Aspects of the disclosure provide effective, efficient, scalable, and convenient technical solutions that address and overcome the technical problems associated with one time password verification. In accordance with one or more embodiments of the disclosure, a computing platform comprising at least one processor, a communication interface, and memory storing computer-readable instructions may receive an event processing request. The computing platform may generate a first one time password. The computing platform may record the first one time password in a distributed ledger. The computing platform may send the first one time password to a first device. The computing platform may receive, from a second device, the first one time password, which may have been sent from the first device to the second device. The computing platform may validate, using the distributed ledger, the first one time password. The computing platform may record, in the distributed ledger, validation information indicating that the first one time password was validated. The computing platform may process, based on validating the first one time password using the distributed ledger, an event corresponding to the event processing request. The computing platform may send, to the second device, a notification indicating that the event was processed and one or more commands directing the second device to display the notification indicating that the event was processed, which may cause the second device to display the notification indicating that the event was processed and that the first one time password was validated using the distributed ledger.

In one or more instances, the first device may be a customer computing device and the second device may be a merchant computing device. In one or more instances, the first device and the second device may correspond to a common entity.

In one or more instances, the computing platform may receive a second event processing request. The computing platform may generate a second one time password. The computing platform may record the second one time password in the distributed ledger. The computing platform may send the second one time password to a third device. The computing platform may receive, from the second device, the second one time password, which may have been sent from the third device to the second device. The computing platform may validate, using the distributed ledger, the second one time password. The computing platform may record, in the distributed ledger, additional validation information indicating that the second one time password was validated. The computing platform may record, in a new entry of the distributed ledger, the validation information and the additional validation information.

In one or more instances, the computing platform may receive a second event processing request. The computing platform may generate a second one time password. The computing platform may record the second one time password in the distributed ledger. The computing platform may send the second one time password to the first device. The computing platform may identify that a period of time has elapsed since sending the second one time password to the first device and that the second one time password has not been received at the computing platform from the second device. The computing platform may determine that the period of time exceeds a threshold time period. In response to determining that the period of time exceeds the threshold time period, the computing platform may: 1) generate a third one time password; 2) record the third one time password in the distributed ledger; 3) send the third one time password to the first device; 4) receive, from the second device, the third one time password, which may have been sent from the first device to the second device; 5) validate, using the distributed ledger, the third one time password; 6) record, in the distributed ledger, additional validation information indicating that the third one time password was validated; and 7) process, based on validating the third one time password using the distributed ledger, an event corresponding to the second event processing request.

In one or more instances, the computing platform may generate the third one time password based on identifying that a trust score corresponding to the first device exceeds a predetermined trust threshold. In one or more instances, the computing platform may generate the trust score corresponding to the first device based on a number of successfully validated one time passwords, corresponding to the first device, in the distributed ledger.

In one or more instances, the computing platform may generate the trust score corresponding to the first device based on a percentage of one time passwords, sent after an initial password and a determination that the period of time has been exceeded, that have been returned to the computing platform from the first device and successfully validated. In one or more instances, recording, in the distributed ledger, the additional validation information indicating that the third one time password was validated further may include recording, in a new entry of the distributed ledger, different than an entry of the distributed ledger in which the validation information was recorded, the additional validation information indicating that the third one time password was validated and information indicating that the second one time password was not validated. In one or more instances, processing the event may correspond to executing a transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces that implement a distributed ledger for OTP verification and correction in accordance with one or more example embodiments.

DETAILED DESCRIPTION

Figure 1A:
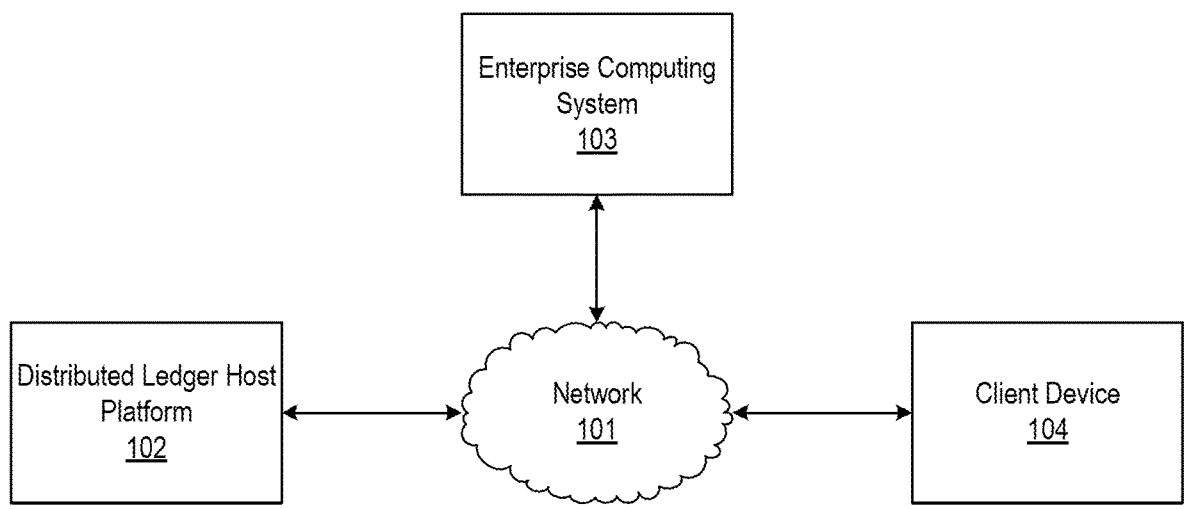
FIGS. 1A-1B depict an illustrative computing environment for implementing a distributed ledger for OTP verification and correction in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a system and method to correct for missing over the phone passcodes and/or passwords in order to complete point of sales transactions. For example, in many geographic regions, it may be customary for a bank to send an over the phone one time passcode or password (OTP) to a customer on the phone or email when the customer requests a credit card purchase transaction. In these instances, the customer may be prompted to respond back by typing the OTP to complete the transaction.

The main reason for this additional step in the transaction is to ensure authenticity of the transaction and also to prevent fraud. However, the customer may be working from a location with disrupted cellular or Wi-Fi coverage and the OTP may not be received by the customer to complete the transaction. Under such circumstances, a customer might not be able to complete the transaction or make the purchase. This may result in a dissatisfied customer, and loss of business for both the merchant and the issuing bank for the credit card.

One way to solve the problem of missing OTP is by sending secondary and backup OTPs when an OTP is deemed missing. However, this problem may become more complicated for several reasons as described below when multiple OTPs are involved.

For example, there is currently no way to confirm from a merchant or bank side whether an OTP is completely missing or just delayed (and may ultimately be delivered on the customer side). If the customer tries to use the OTP that is delivered late, he or she may discover that a time window to enter the OTP has closed. Alternatively, if the window is not closed and the customer successfully enters the OTP, the window of acceptance at the merchant or bank side may have expired regardless of whether or not the customer successfully enters the OTP. In this case, the transaction may still be denied even though the customer entered the OTP successfully and expects the transaction to be completed. This may create more dissatisfaction in a customer and loss of revenue for both the merchant and the bank, and may result in a loss of customer and/or bad reputation.

This problem is further complicated when a bank determines that an OTP may be missing, and sends a new OTP instead. Since the network packets carrying the secondary or other OTPs are not causal in nature (e.g., they do not follow the time scale exactly), there is a chance that an OTP that is sent later may be received by the customer earlier. Since only one OTP may be the valid OTP at any point for the transaction, from a security perspective it may be unclear which OTP should be the valid OTP from the bank side and which OTP the customer should enter for acceptance by the bank. This problem may be further complicated when a customer receives multiple OTPs and does not know which one to use.

Described herein are systems and methods that solve the problem of missing OTP (or other two factor authentication schemes) using a block-chain method. Block-chains are becoming more and more popular beyond their original application areas of crypto-currencies. Such applications may enable smart contracts that may be used to create an open and shared ledger for all types of transactions. The advantage of a block-chain based shared ledger over traditional ledgers is that all transactional entries in a block-chain based ledger are by virtue always correct and valid. The validity of all transactions is enforced by the existing nodes of the block-chain, and an otherwise invalid transaction might never be entered in a block-chain. Another advantage is that all the entries of a block-chain are shared and open to all participants of the block-chain and hence auditing of each transaction is also guaranteed. In fact, creating an audit trail of all transactions is natural to all block-chain based open ledgers that allow smart contracts. Each entry to a block-chain based open-ledger is also immutable. Hence, once entered, it might not be modified by anyone. Accordingly, blockchain is uniquely suitable for completing two factor authentication.

The block-chain may be a sequential structure of blocks where each block may store one or more transactions. The transactions may be sequential in nature and time scale with one transaction preceding another along the time scale.

A block-chain may be temporarily created for each point of sale transaction when the sale is initiated and/or may be used for multiple transactions among three parties (e.g., a customer, a merchant, and a bank).

If a private block-chain among the three parties exists, that may be repurposed to solve the problem of missing OTP. If a private block-chain is not available, one or more aspects of the disclosure may be implemented on a public block chain as long as the transactions are securely encrypted using Rivest-Shamir-Adleman (RSA) or other secure means of cryptography using 16 HEX or other secure technologies.

A block-chain as a distributed open ledger ensures that all transactions are validated before they may be entered in a ledger. For example, validating an OTP may consist of the following steps: 1) at the request of a customer for a credit and the bank approving the credit, the bank creates a unique OTP or other dual authentication method and sends it to the customer using the appropriate channel, 2) upon receipt of the OTP or other dual authentication requests, the customer performs the appropriate actions such as entering the OTP at an appropriate place, 3) upon completion of the appropriate action, the bank validates the action and requests to enter the above OTP validation as a valid transaction at the block-chain, 4) all three involved parties verify the transaction as valid, and it is entered into the block-chain as an immutable entry. If any of the above steps 1-4 are not completed, the bank may notify the parties involved that a new OTP is generated for the requested credit, and steps 1-4 may be repeated until a valid transaction is entered in the block-chain. Once a valid transaction is entered in the block-chain as an immutable entry, the approved credit request may be communicated to the merchant and the purchase may be completed. The method described above may be performed on a standalone block-chain for OTP or two factor authentication and/or may be used as an enhancement of existing methodologies for creating smarter contracts among merchants, banks, and customers.

Figure 1B:
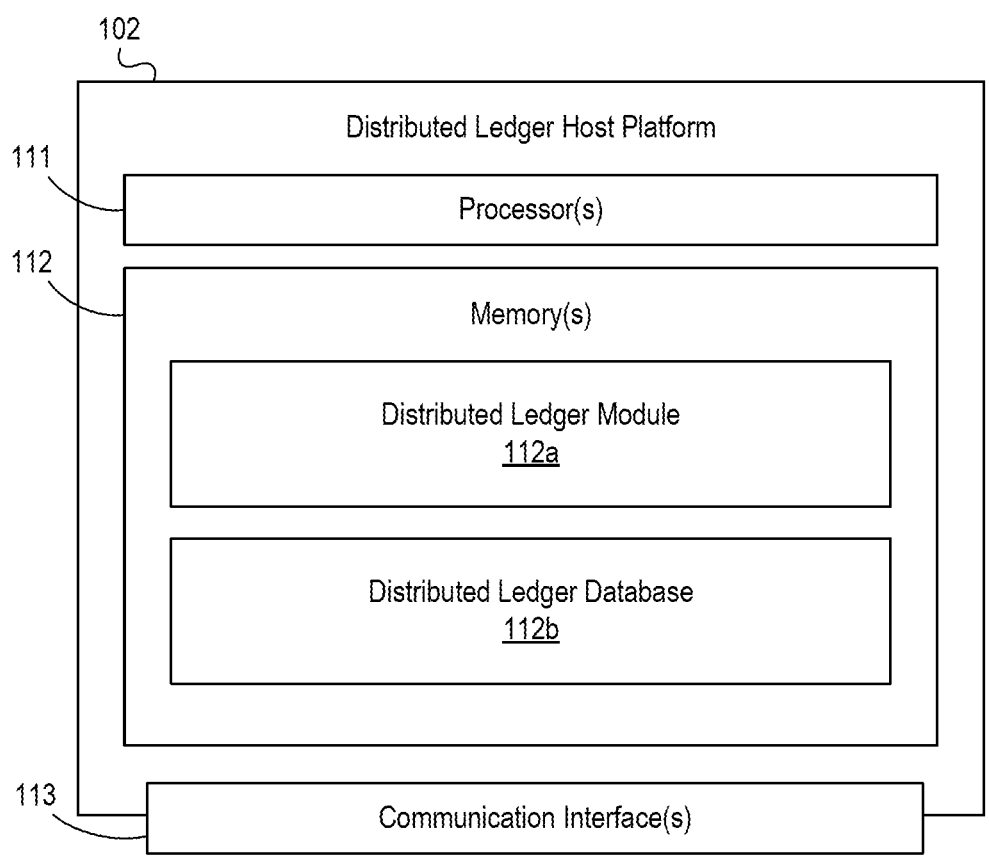

FIGS. 1A-1B depict an illustrative computing environment that implements a distributed ledger for OTP verification and correction in accordance with one or more example embodiments. Referring to FIG. 1A, computing environment 100 may include one or more computer systems. For example, computing environment 100 may include a distributed ledger host platform 102, an enterprise computing system 103, and a client device 104.

As described further below, distributed ledger host platform 102 may be a computer system that includes one or more computing devices (e.g., servers, server blades, or the like) and/or other computer components (e.g., processors, memories, communication interfaces) that may be used to identify, generate, and maintain a distributed ledger, generate OTPs, and record, using the distributed ledger, the OTPs and corresponding OTP validation information (e.g., indicating whether or not each OTP was validated). In some instances, the distributed ledger host platform 102 may be controlled or otherwise maintained by an enterprise organization such as a financial institution.

Enterprise computing system 103 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or event processing. For example, the enterprise computing system 103 may be operated by a merchant, and may be used to process transactions. In one or more instances, the enterprise computing system 103 may be configured to communicate with the distributed ledger host platform 102 for OTP validation.

Client device 104 may be a laptop computer, desktop computer, mobile device, tablet, smartphone, or the like that may be used by an individual such as a customer of an enterprise organization (e.g., a merchant, or the like). For example, the client device 104 may be used by one or more individuals to perform a transaction with a merchant (e.g., by initiating a fund transfer through one or more applications, such as a mobile banking application). In some instances, the client device 104 may be controlled or otherwise maintained by a common entity that is controlling or otherwise maintaining the enterprise computing system 103. In some instances, client device 104 may be configured to display one or more user interfaces (e.g., interfaces corresponding to a mobile banking application, which may be hosted by the distributed ledger host platform in some instances).

Computing environment 100 also may include one or more networks, which may interconnect distributed ledger host platform 102, enterprise computing system 103, and client device 104. For example, computing environment 100 may include a network 101 (which may interconnect, e.g., distributed ledger host platform 102, enterprise computing system 103, and client device 104).

In one or more arrangements, distributed ledger host platform 102, enterprise computing system 103, and client device 104 may be any type of computing device capable of sending and/or receiving requests and processing the requests accordingly. For example, distributed ledger host platform 102, enterprise computing system 103, client device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed ledger host platform 102, enterprise computing system 103, and client device 104, may, in some instances, be special-purpose computing devices configured to perform specific functions.

Referring to FIG. 1B, distributed ledger host platform 102 may include one or more processors 111, memory 112, and communication interface 113. A data bus may interconnect processor 111, memory 112, and communication interface 113. Communication interface 113 may be a network interface configured to support communication between distributed ledger host platform 102 and one or more networks (e.g., network 101, or the like). Memory 112 may include one or more program modules having instructions that when executed by processor 111 cause distributed ledger host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of distributed ledger host platform 102 and/or by different computing devices that may form and/or otherwise make up distributed ledger host platform 102. For example, memory 112 may have, host, store, and/or include distributed ledger module 112a and distributed ledger database 112b.

Distributed ledger module 112a may have instructions that direct and/or cause distributed ledger host platform 102 to execute advanced techniques to generate/maintain distributed ledgers corresponding to OTPs and associated OTP validation information. Distributed ledger database 112b may store information that may be used by the distributed ledger module 112a and/or the distributed ledger host platform 102 to generate/maintain distributed ledgers corresponding to OTPs and associated OTP validation information, and/or to perform other functions.

Figure 2A:
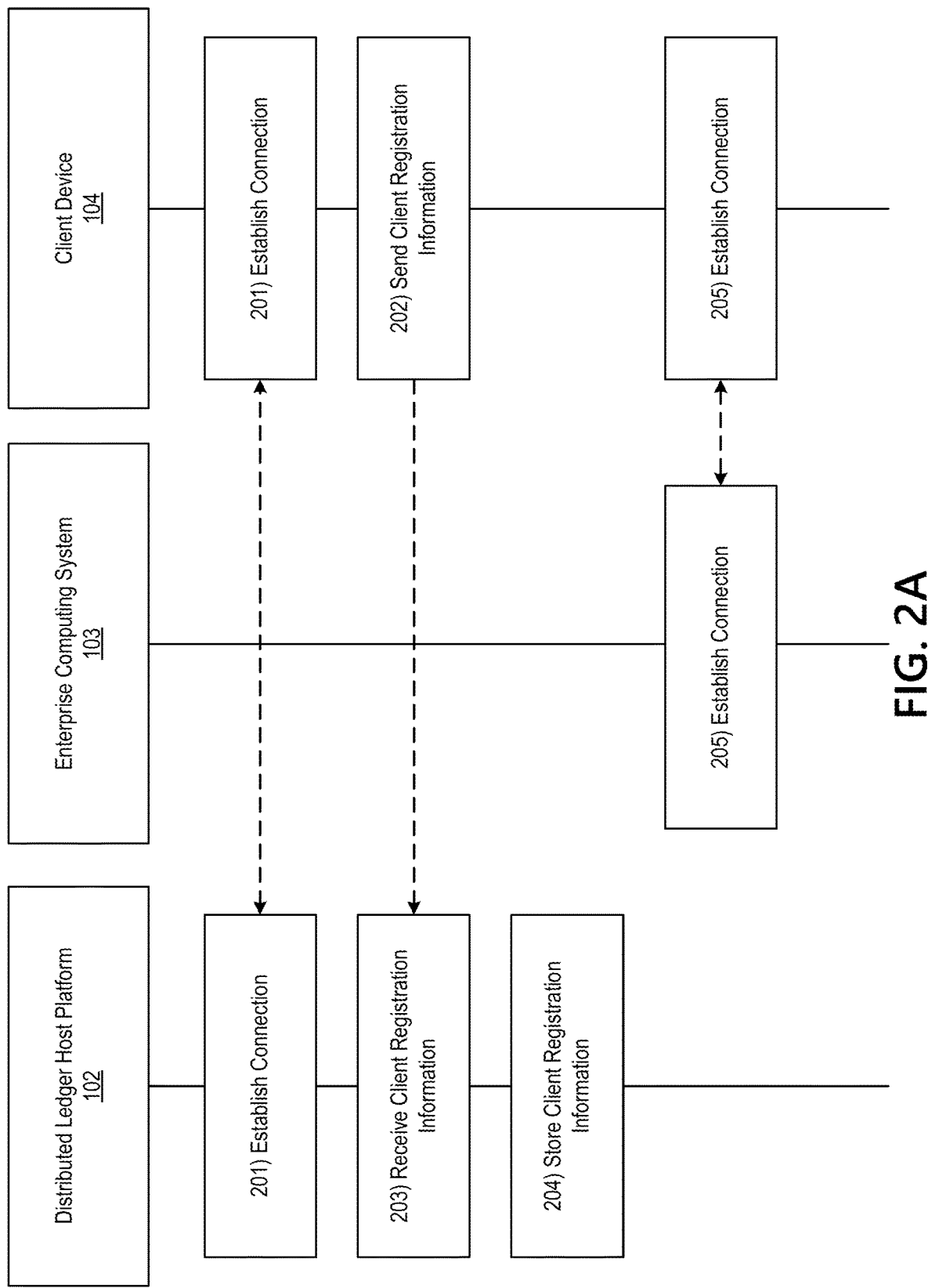
FIGS. 2A-2E depict an illustrative event sequence for implementing a distributed ledger for OTP verification and correction in accordance with one or more example embodiments.

FIGS. 2A-2E depict an illustrative event sequence for implementing a distributed ledger for OTP verification and correction in accordance with one or more example embodiments. Referring to FIG. 2A, at step 201, the client device 104 may establish a connection with the distributed ledger host platform 102. For example, the client device 104 may establish a first wireless data connection to link the client device 104 to the distributed ledger host platform 102 (e.g., in preparation for sending client registration information). In some instances, the client device 104 may identify whether or not a connection is already established with the distributed ledger host platform 102. If a connection is already established with the distributed ledger host platform 102, the client device might not re-establish the connection. If a connection is not yet established with the distributed ledger host platform 102, the client device 104 may establish the first wireless data connection as described herein.

At step 202, the client device 104 may send client registration information to the distributed ledger host platform 102. For example, the client device 104 may send information indicating that a client should be enrolled into a distributed ledger OTP validation service hosted by the distributed ledger host platform 102. In some instances, in sending the client registration information, the client device 104 may send information that may be used by the distributed ledger host platform 102 to generate a management profile for a user of the client device 104. In some instances, the client device may send the client registration information to the distributed ledger host platform 102 while the first wireless data connection is established.

At step 203, the distributed ledger host platform 102 may receive the client registration information sent at step 202. For example, the distributed ledger host platform 102 may receive the client registration information via the communication interface 113 and while the first wireless data connection is established.

At step 204, the distributed ledger host platform 102 may store the client registration information received at step 203. For example, the distributed ledger host platform 102 may enroll user of the client device 104 into the distributed ledger OTP validation service, and may create a management profile for the client device 104. In some instances, the distributed ledger host platform 102 may provision the management profile with the user of the client device 104.

At step 205, client device 104 may establish a connection with the enterprise computing system 103. For example, the client device 104 may establish a second wireless data connection with the enterprise computing system 103 to link the client device to the enterprise computing system 103 (e.g., in preparation for sending an event processing request). In some instances, the client device 104 may identify whether or not a connection is already established with the enterprise computing system 103. If a connection is already established with the enterprise computing system 103, the client device 104 might not re-establish the connection. If a connection is not yet established with the enterprise computing system 103, the client device 104 may establish the second wireless data connection as described herein.

Figure 2B:
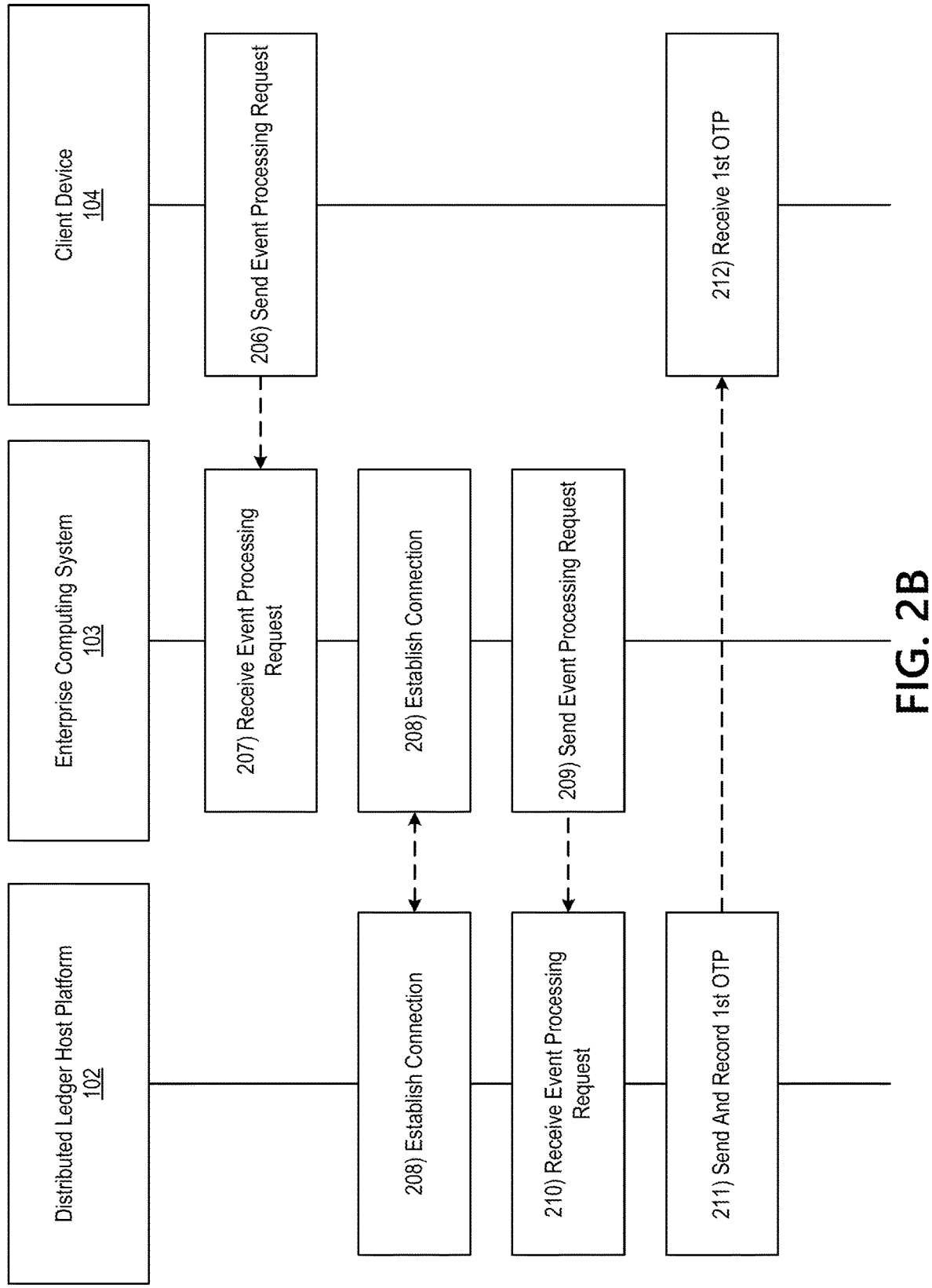

Referring to FIG. 2B, at step 206, the client device 104 may send an event processing request to the enterprise computing system 103. For example, the client device 104 may send a request (e.g., by communicating with the enterprise computing system 103 in a touchless manner, interacting with a website hosted by the enterprise computing system 103, and/or other methods) to process a transaction. In some instances, the client device 104 may send account information, credit card information, and/or other information that may be used for event processing. In some instances, the client device 104 may send the event processing request to the enterprise computing system 103 while the second wireless data connection is established.

At step 207, the enterprise computing system 103 may receive the event processing request sent at step 206. In some instances, the enterprise computing system 103 may receive the event processing request while the second wireless data connection is established.

At step 208, the enterprise computing system 103 may establish a connection with the distributed ledger host platform 102. For example, the enterprise computing system 103 may establish a third wireless data connection with the distributed ledger host platform 102 to link the enterprise computing system 103 to the distributed ledger host platform 102 (e.g., in preparation for forwarding the event processing request received at step 207). In some instances, the enterprise computing system 103 may identify whether or not a connection is already established with the distributed ledger host platform 102. If a connection is already established with the distributed ledger host platform 102, the enterprise computing system 103 might not re-establish the connection. If a connection is not yet established with the distributed ledger host platform 102, the enterprise computing system 103 may establish the third wireless data connection as described herein. In some instances, the distributed ledger host platform 102 may verify and/or otherwise secure the connection based on the management profile.

At step 209, the enterprise computing system 103 may send the event processing request to the distributed ledger host platform 102. For example, the enterprise computing system 103 may send the event processing request to the distributed ledger host platform 102 while the third wireless data connection is established.

At step 210, the distributed ledger host platform 102 may receive the event processing request. For example, the distributed ledger host platform 102 may receive the event processing request via the communication interface 113 and while the third wireless data connection is established.

At step 211, based on or in response to the event processing request received at step 210, the distributed ledger host platform 102 may generate a first OTP. The distributed ledger host platform 102 may send the first OTP to the client device 104. For example, the distributed ledger host platform 102 may send the first OTP to the client device 104 via the communication interface 113 and while the first wireless data connection is established. In addition, the distributed ledger host platform 102 may record the first OTP in a distributed ledger. For example, the distributed ledger host platform 102 may establish an entry in the distributed ledger that includes the first OTP.

In some instances, the distributed ledger host platform 102 may establish the distributed ledger to record OTP information and corresponding validation information. For example, the distributed ledger host platform 102 may establish an entry in the distributed ledger for each event requested by the client device 104. In each entry, the distributed ledger host platform 102 may record the generated OTPs and corresponding validation information indicating whether or not each OTP was returned to the distributed ledger host platform 102 and validated. Once a subsequent event processing request is received, the distributed ledger host platform 102 may establish a new entry in the distributed ledger and record corresponding OTPs and validation information. Then, once a third event processing request is received, the distributed ledger host platform 102 may compress the entries for the initial and subsequent event processing requests, and establish a new entry for the third event processing request. In some instances, the distributed ledger host platform 102 may maintain a single distributed ledger that includes event processing requests for a plurality of client devices.

In some instances, in establishing the distributed ledger, the distributed ledger host platform may establish a public distributed ledger, which may provide an enhanced level of trust corresponding to the distributed ledger (e.g., because it may be visible to all parties). In other instances, in establishing the distributed ledger, the distributed ledger host platform may establish a private distributed ledger, which may provide advantages in terms of processing efficiency.

At step 212, the client device 104 may receive the first OTP sent at step 211. For example, the client device 104 may receive the first OTP while the first wireless data connection is established.

Figure 2C:
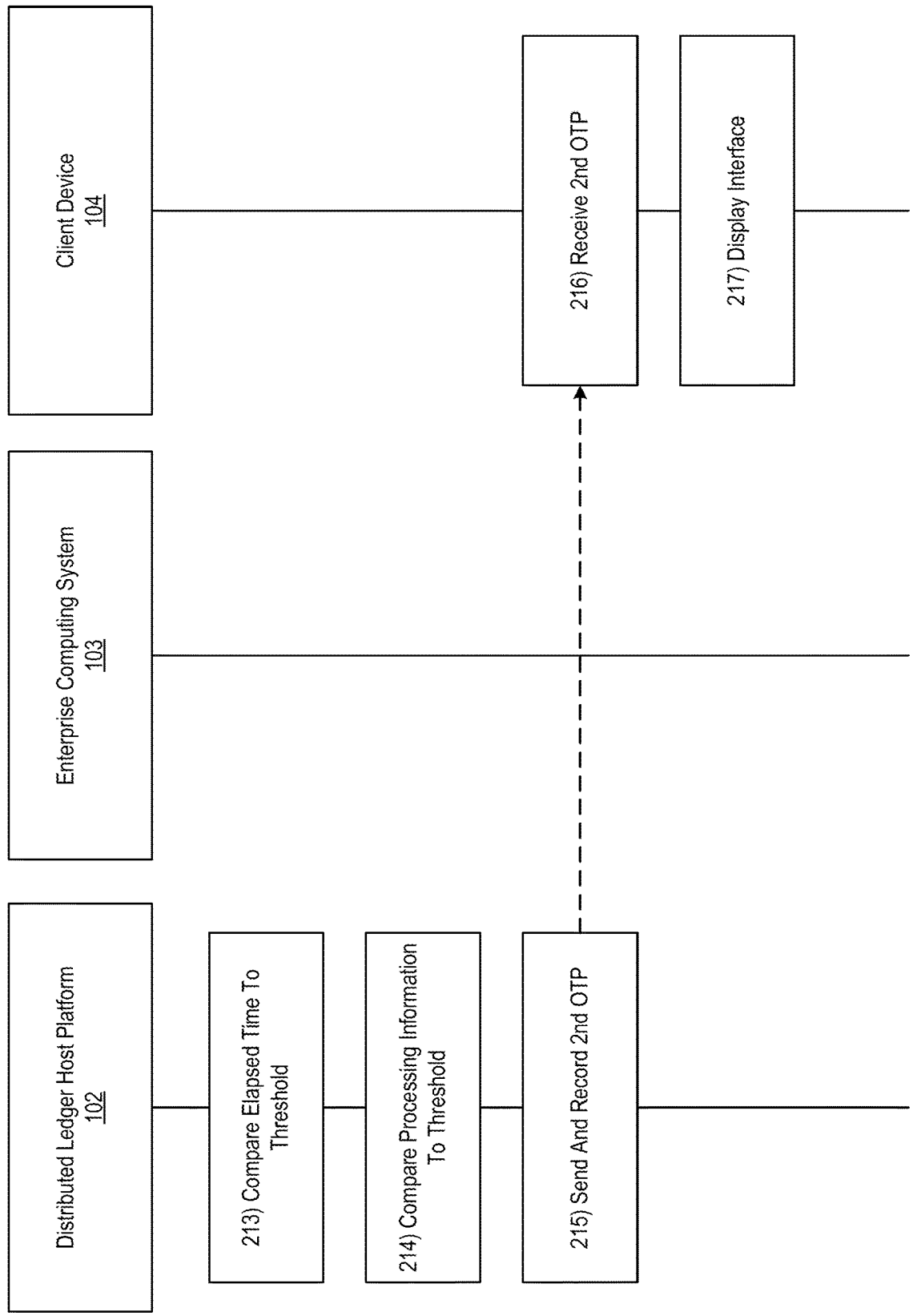

Referring to FIG. 2C, at step 213, the distributed ledger host platform 102 may identify a period of time that has elapsed since sending the first OTP. In some instances, the first OTP and/or OTP information corresponding to the first OTP may be received from the enterprise computing system 103 (e.g., the client device 104 may have shared the first OTP with the enterprise computing system 103) and/or the client device 104 (e.g., the first OTP may be used to authenticate the requested event for processing). In these instances, an OTP input may have been received at the client device 104 and sent to the distributed ledger host platform as described in steps 218 and 219. Accordingly, in this instances, the distributed ledger host platform 102 may proceed to step 220.

In instances where the first OTP and/or information corresponding to the first OTP has not yet been received, the distributed ledger host platform 102 may compare the identified period of time with a threshold amount of time. Once the identified period of time exceeds the threshold amount of time, the distributed ledger host platform 102 may proceed to step 214. In some instances, step 214 may be optional, and the distributed ledger host platform 102 may skip this step and proceed to step 215.

At step 214, the distributed ledger host platform 102 may identify a trust level corresponding to the client device 104. For example, in some instances, the distributed ledger host platform 102 may consult the distributed ledger to identify a number of times that a second OTP has been sent to the client device 104 (e.g., because the client device 104 did not respond with a first OTP before expiration of the threshold amount of time). After identifying this number of times, the distributed ledger host platform 102 may identify how many of these second OTPs were ultimately returned to the distributed ledger host platform 102. For example, the distributed ledger host platform 102 may identify a percentage of second OTPs that are returned to the distributed ledger host platform 102 from the client device 104 (e.g., the distributed ledger host platform 102 may identify how likely the client device 104 is to return a second OTP if it is sent). The distributed ledger host platform 102 may be able to identify this information, because the distributed ledger may include information indicating each OTP that has been generated for the client device 104 and OTP validation information indicating whether or not each generated OTP was validated (e.g., successfully returned to the distributed ledger host platform 102 and verified). The distributed ledger host platform 102 may compare the percentage of returned second OTPs to an OTP threshold. If the distributed ledger host platform 102 identifies that the percentage exceeds the OTP threshold, the distributed ledger host platform 102 may proceed to step 215. If the distributed ledger host platform 102 identifies that the percentage does not exceed the OTP threshold, the event sequence may end.

Additionally or alternatively, the distributed ledger host platform 102 may identify a transaction amount corresponding to the event processing request. If the distributed ledger host platform 102 identifies that the transaction amount exceeds a threshold amount, the distributed ledger host platform 102 may proceed to step 215, whereas if the distributed ledger host platform 102 identifies that the transaction amount does not exceed the threshold amount, the event sequence may end.

Additionally or alternatively, the distributed ledger host platform 102 may generate a trust score for the client device 104. For example, the distributed ledger host platform 102 may consult the distributed ledger to identify a percentage of OTPs, returned to the distributed ledger host platform 102 and corresponding to the client device 104, that have been invalid. The distributed ledger host platform 102 may compare this percentage of invalid OTPs to an invalid OTP threshold. If the distributed ledger host platform 102 identifies that the percentage of invalid OTPs exceeds the invalid OTP threshold, the event sequence may end. If the distributed ledger host platform 102 identifies that the percentage of invalid OTPs does not exceed the invalid OTP threshold, the distributed ledger host platform 102 may proceed to step 215.

In doing so, the distributed ledger host platform 102 may apply one or more filters to identify a likelihood of successful processing of the requested event if a second OTP is sent. By avoiding sending second OTPs in situations that the second OTPs is unlikely to result in successful processing of the event, the distributed ledger host platform 102 may conserve processing power and network bandwidth (e.g., by not transmitting the second OTP).

At step 215, the distributed ledger host platform 102 may generate a second OTP, and may send the second OTP to the client device 104. For example, the distributed ledger host platform 102 may send the second OTP to the client device 104 via the communication interface 113 and while the first wireless data connection is established. In addition, the distributed ledger host platform 102 may record the second OTP in the distributed ledger. For example, the distributed ledger host platform 102 may record the second OTP in the distributed ledger that includes the first OTP.

At step 216, the client device 104 may receive the second OTP sent at step 215. For example, the client device 104 may receive the second OTP while the first wireless data connection is established.

At step 217, the client device 104 may display an OTP input interface. For example, the client device 104 may display a graphical user interface similar to graphical user interface 405, which is illustrated in FIG. 4. For example, the client device 104 may display a graphical user interface prompting for the OTP to be entered. In some instances, the client device 104 may display a graphical user interface corresponding to the distributed ledger host platform 102 (e.g., a mobile banking interface). In some instances, in displaying the OTP input interface, the client device 104 may redirect a user from a website hosted by the enterprise computing system 103 to a website hosted by the distributed ledger host platform 102 (e.g., from a merchant website to a banking portal).

Figure 2D:
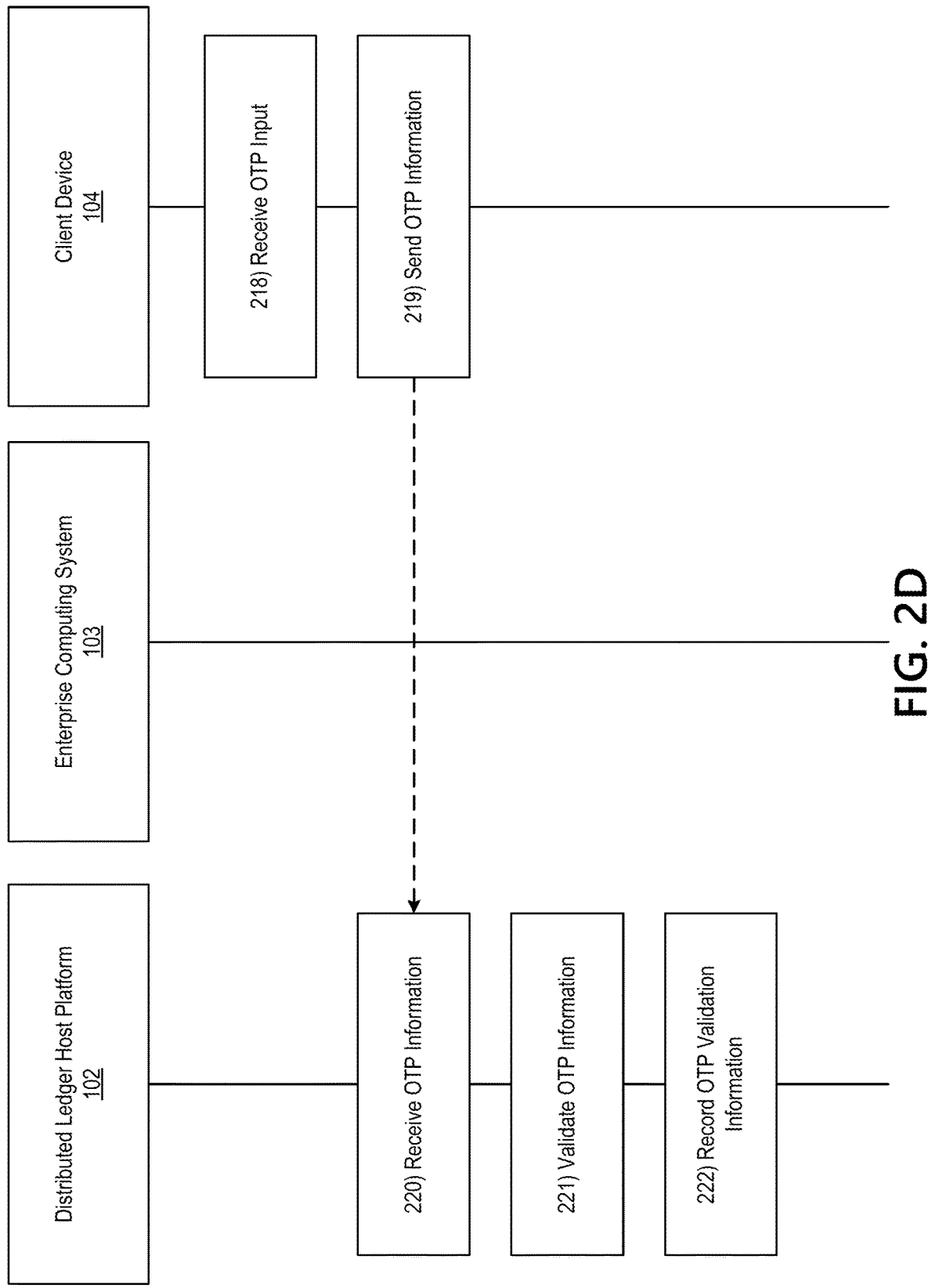

Referring to FIG. 2D, at step 218, the client device 104 may receive an OTP input. For example, the client device 104 may receive a user input corresponding to the first or second OTP.

At step 219, the client device 104 may send OTP information, corresponding to the OTP input at step 218, to the distributed ledger host platform 102. For example, the client device 104 may send the OTP information to the distributed ledger host platform 102 while the first wireless data connection is established. Additionally or alternatively, the client device 104 may send the OTP information to the enterprise computing system 103 (e.g., the OTP may be entered at a website or portal hosted by the enterprise computing system 103) and the enterprise computing system 103 may share the OTP information with the distributed ledger host platform 102.

At step 220, the distributed ledger host platform 102 may receive the OTP information sent at step 219. For example, the distributed ledger host platform 102 may receive the OTP information via the communication interface 113 and while the first wireless data connection is established.

At step 221, the distributed ledger host platform 102 may validate the OTP information received at step 220. For example, the distributed ledger host platform 102 may compare the OTP information to the OTPs stored in the entry of the distributed ledger corresponding to the requested event processing. In doing so, the distributed ledger host platform 102 may identify whether or not a valid OTP was received at step 220.

At step 222, the distributed ledger host platform 102 may record OTP validation information. For example, in the same entry as the first OTP and the second OTP were recorded, the distributed ledger host platform 102 may record information indicating whether or not each of the first OTP and the second OTP were validated. For example, if the distributed ledger host platform 102 received and validated the second OTP, but not the first OTP, the distributed ledger host platform 102 would record information indicating that the first OTP was not validated and the second OTP was validated. If at least one of the OTPs was successfully validated, the distributed ledger host platform 102 may proceed to step 223. If none of the OTPs were successfully validated, the event sequence may end.

Figure 2E:
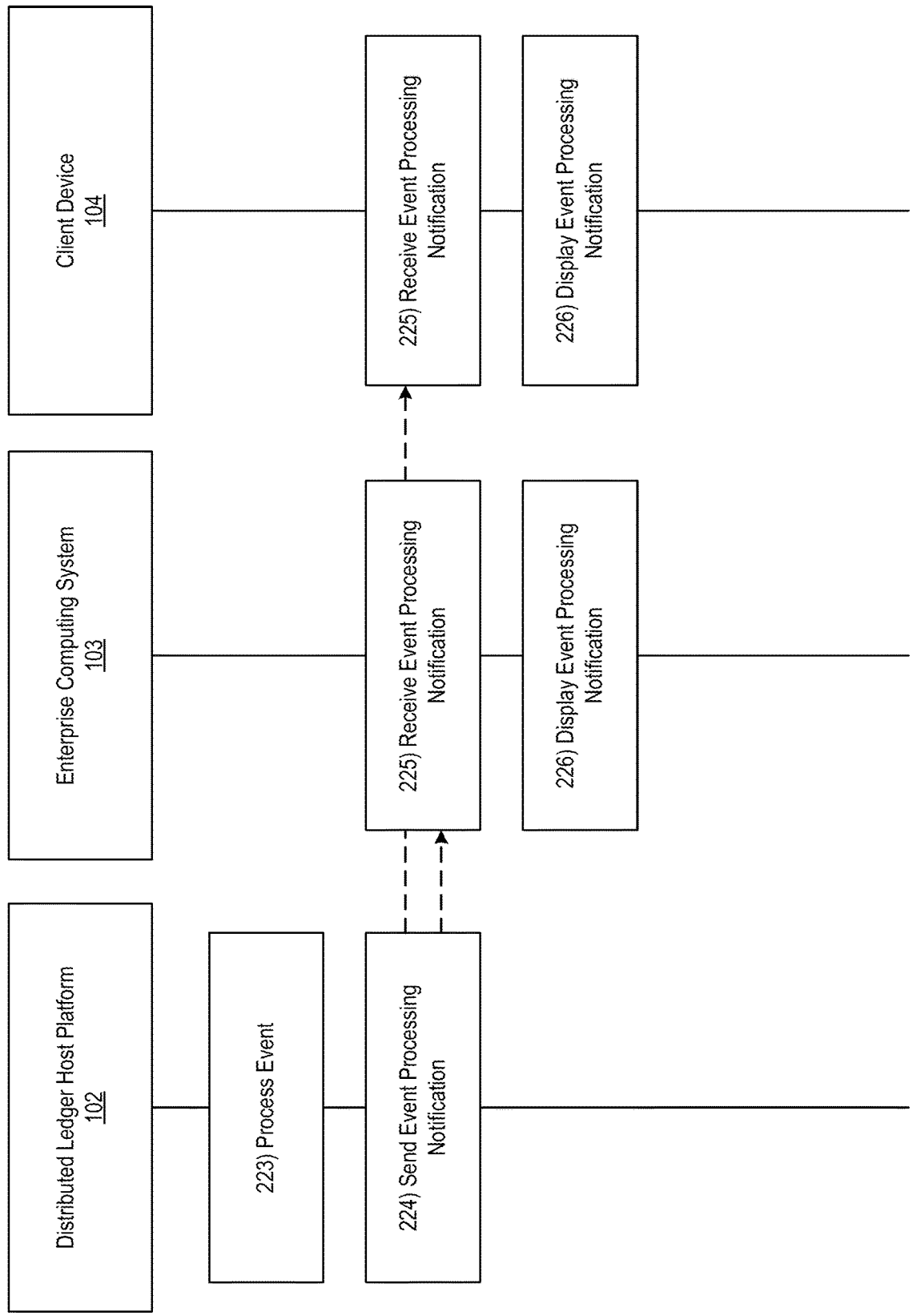

Referring to FIG. 2E, at step 223, the distributed ledger host platform 102 may process the requested event. For example, the distributed ledger host platform 102 may cause funds to be transferred from an account corresponding to the client device 104 (e.g., a personal bank account) to an account corresponding to the enterprise computing system 103 (e.g., an account corresponding to the merchant affiliated with enterprise computing system 103).

At step 224, the distributed ledger host platform 102 may send an event processing notification to the enterprise computing system 103 and/or the client device 104 indicating that the event was processed. In some instances, the distributed ledger host platform 102 may also send one or more commands directing the enterprise computing system 103 and/or the client device 104 to display the event processing notification. In some instances, the distributed ledger host platform 102 may send the event processing notification via the communication interface 113 and while the first and/or third wireless data connections are established.

At step 225, the enterprise computing system 103 and/or the client device 104 may receive the event processing notification sent at step 224. In some instances, the enterprise computing system 103 and/or the client device 104 may also receive the one or more commands directing the enterprise computing system 103 and/or the client device 104 to display the event processing notification. In some instances, the enterprise computing system 103 and/or the client device 104 may receive the event processing notification while the first and/or third wireless data connections are established.

At step 226, the enterprise computing system 103 and/or the client device 104 may display, based on or in response to the one or more commands directing the enterprise computing system 103 and/or the client device 104 to display the event processing notification, the event processing notification. For example, the enterprise computing system 103 and/or the client device 104 may display a graphical user interface similar to graphical user interface 505, which is shown in FIG. 5. For example, the enterprise computing system 103 and/or the client device 104 may display a graphical user interface indicating that the requested event was processed. In some instances, the enterprise computing system 103 and/or the client device 104 may display an interface indicating that an OTP was validated using the distributed ledger.

Although the systems and methods described above describe a single enterprise computing device and client device, any number of enterprise and/or client device may be implemented without departing from the scope of this disclosure. Similarly, although a first and second OTP are described, any number of OTPs may be implemented without departing from the scope of this disclosure. Similarly, although a single entry in the distributed ledger is described (e.g., that contains information for the first and second OTPs), any number of entries may be implemented without departing from the scope of the disclosure.

Figure 3:
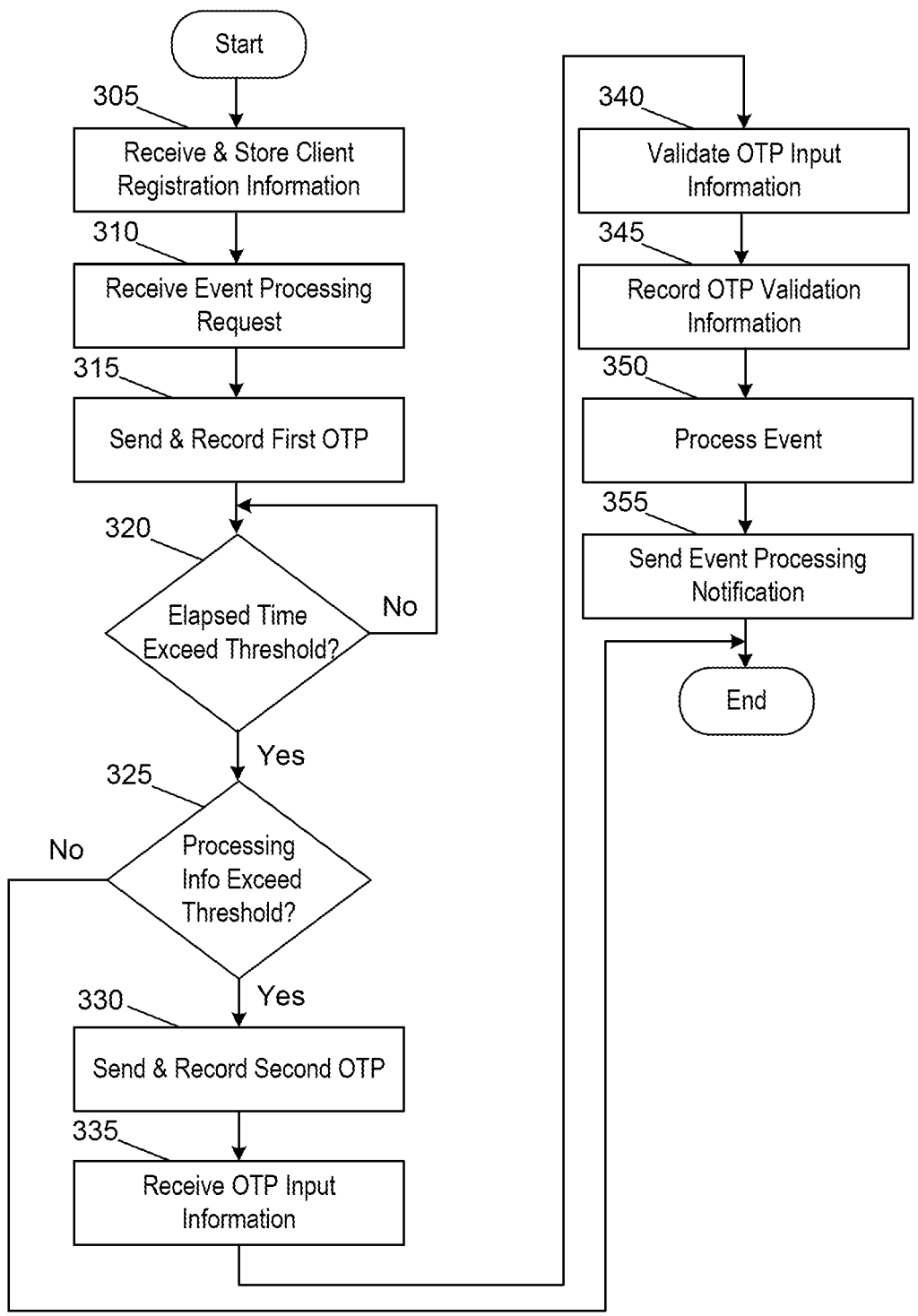
FIG. 3 depicts an illustrative method for implementing a distributed ledger for OTP verification and correction in accordance with one or more example embodiments.

FIG. 3 depicts an illustrative method for implementing a distributed ledger for OTP verification and correction in accordance with one or more example embodiments. Referring to FIG. 3, at step 305, a computing platform having at least one processor, a communication interface, and memory may receive and store client registration information. At step 310, the computing platform may receive an event processing request. At step 315, the computing platform may send and record a first OTP. At step 320, the computing platform may identify whether a time threshold has been exceeded since the sending of the first OTP if the first OTP has not been returned to the computing platform. If not, the computing platform may wait for expiration of the time threshold. If the time threshold is exceeded, the computing platform may proceed to step 325.

At step 325, the computing platform may identify whether processing information exceeds another threshold (e.g., a trust level threshold, an OTP return rate threshold, a value threshold, and/or other thresholds indicating likelihood of success of a second OTP). If the processing information does not exceed the threshold, the method may end. If the processing information does exceed the threshold, the computing platform may proceed to step 330.

At step 330, the computing platform may send a record a second OTP. At step 335, the computing platform may receive OTP input information. At step 340, the computing platform may validate the OTP input information. At step 345, the computing platform may record OTP validation information. At step 350, the computing platform may process the requested event. At step 355, the computing platform may send an event processing notification indicating that the event was processed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, configured to perform a blockchain based method to conserve processing power and network bandwidth when accounting for missing one time passwords, comprising:
   at least one processor;
   a communication interface communicatively coupled to the at least one processor; and
   memory storing computer-readable instructions that, when executed by the at least one processor, cause the computing platform to:
      receive an event processing request;
      generate a first one time password;
      record the first one time password in a distributed ledger by adding a new entry to the distributed ledger that includes the first one time password, wherein the distributed ledger:
         is configured to enable smart contracts for event processing requests,
         comprises a sequential structure of blocks each storing one of the event processing requests, wherein the event processing requests are sequential in nature and time scale,
         comprises one of: a private blockchain or a public blockchain, wherein the public blockchain is encrypted using Rivest-Shamir-Adleman;
      send the first one time password to a first device, wherein the first device is operating on a disrupted cellular network, and wherein the disrupted cellular network prevents receipt of the first one time password by the first device;
      identify that a period of time has elapsed since sending the first one time password to the first device and that the first one time password has not been received at the computing platform from the first device;
      identify that the period of time exceeds a threshold time period;
      in response to determining that the period of time exceeds the threshold time period:
         generate a second one time password;
         record the second one time password in the distributed ledger;
         send the second one time password to the first device, wherein the first device is configured to:
            present an interface prompting for the second one time password to be entered, wherein presenting the interface comprises redirecting the first device from a first website hosted by an enterprise server to a second website hosted by the computing platform, and
            receive, via the interface and from a user of the first device, input of the second one time password, wherein receipt of the input of the second one time password causes, based on the redirection of the first device from the first website hosted by the enterprise server to the second website hosted by the computing platform, the second one time password to be communicated to the computing platform;
         validate, using the distributed ledger and based on the redirection of the first device from the first website hosted by the enterprise server to the second website hosted by the computing platform, the second one time password, wherein validating the second one time password comprises performing a multi-party validation of the second one time password by the user, an enterprise corresponding to the enterprise server, and an enterprise corresponding to the computing platform;
record, in the distributed ledger, validation information indicating that the second one time password was validated; and
process, based on validating the second one time password using the distributed ledger, an event corresponding to the event processing request.

2. The computing platform of claim 1, wherein the first device is a customer computing device and a second device is a merchant computing device.

3. The computing platform of claim 2, wherein the first device and the second device correspond to a common entity.

4. The computing platform of claim 2, wherein the memory stores additional computer-readable instructions that, when executed by the at least one processor, cause the computing platform to:
receive a second event processing request;
generate a third one time password;
record the third one time password in the distributed ledger;
send the third one time password to the second device;
receive, from the first device, the third one time password, wherein the third one time password was sent from the second device to the first device;
validate, using the distributed ledger, the third one time password;
record, in the distributed ledger, additional validation information indicating that the third one time password was validated; and
record, in a new entry of the distributed ledger, the validation information and the additional validation information.

5. The computing platform of claim 1, wherein recording the first one time password using the distributed ledger:
ensures validity of the first one time password,
ensures that the record of the first one time password has been audited, and
ensures that the record of the first one time password is immutable.

6. The computing platform of claim 1, wherein generating the second one time password is further based on identifying that a trust score corresponding to the first device exceeds a predetermined threshold, wherein the trust score is generated based on a percentage of one time passwords, sent after an initial password and a determination that the period of time has been exceeded, that have been returned to the computing platform from the first device and successfully validated.

7. The computing platform of claim 1, wherein the memory stores additional computer-readable instructions that, when executed by the at least one processor, cause the computing platform to:
send, to the first device, a notification indicating that the event was processed and one or more commands directing the first device to display the notification indicating that the event was processed, wherein sending the one or more commands directing the first device to display the notification indicating that the event was processed causes the first device to display the notification indicating that the event was processed and that the second one time password was validated using the distributed ledger.

8. The computing platform of claim 1, wherein processing the event comprises executing a transaction.

9. A blockchain based method to conserve processing power and network bandwidth when accounting for missing one time passwords, the blockchain based method comprising:
at a computing platform comprising at least one processor, a communication interface, and memory:
receiving, by the at least one processor, an event processing request;
generating, by the at least one processor, a first one time password;
recording, by the at least one processor, the first one time password in a distributed ledger by adding a new entry to the distributed ledger that includes the first one time password, wherein the distributed ledger:
is configured to enable smart contracts for event processing requests,
comprises a sequential structure of blocks each storing one of the event processing requests, wherein the event processing requests are sequential in nature and time scale,
comprises one of: a private blockchain or a public blockchain, wherein the public blockchain is encrypted using Rivest-Shamir-Adleman;
sending, by the at least one processor, the first one time password to a first device, wherein the first device is operating on a disrupted cellular network, and wherein the disrupted cellular network prevents receipt of the first one time password by the first device;
identifying that a period of time has elapsed since sending the first one time password to the first device and that the first one time password has not been received at the computing platform from the first device;
identifying that the period of time exceeds a threshold time period;
in response to determining that the period of time exceeds the threshold time period:
generating a second one time password;
recording the second one time password in the distributed ledger;
sending the second one time password to the first device, wherein the first device is configured to:
present an interface prompting for the second one time password to be entered, wherein presenting the interface comprises redirecting the first device from a first website hosted by an enterprise server to a second website hosted by the computing platform, and
receive, via the interface and from a user of the first device, input of the second one time password, wherein receipt of the input of the second one time password causes, based on the redirection of the first device from the first website hosted by the enterprise server to the second website hosted by the computing platform, the second one time password to be communicated to the computing platform;
validating, using the distributed ledger and based on the redirection of the first device from the first website hosted by the enterprise server to the second website hosted by the computing platform, the second one time password, wherein validating the second one time password comprises performing a multi-party validation of the second one time password by the user, an enterprise corresponding to the enterprise server, and an enterprise corresponding to the computing platform;

recording, in the distributed ledger, validation information indicating that the second one time password was validated; and processing, based on validating the second one time password using the distributed ledger, an event corresponding to the event processing request.

10. The blockchain based method of claim 9, wherein the first device is a customer computing device and a second device is a merchant computing device.

11. The blockchain based method of claim 10, wherein the first device and the second device correspond to a common entity.

12. The blockchain based method of claim 10, further comprising:

receiving, by the at least one processor, a second event processing request;

generating, by the at least one processor, a third one time password;

recording, by the at least one processor, the third one time password in the distributed ledger;

sending, by the at least one processor, the third one time password to the second device;

receiving, by the at least one processor and from the first device, the third one time password, wherein the third one time password was sent from the second device to the first device;

validating, by the at least one processor and using the distributed ledger, the third one time password;

recording, by the at least one processor and in the distributed ledger, additional validation information indicating that the third one time password was validated; and recording, by the at least one processor and in a new entry of the distributed ledger, the validation information and the additional validation information.

13. The method of claim 9, wherein recording the first one time password using the distributed ledger:

ensures validity of the first one time password, ensures that the record of the first one time password has been audited, and ensures that the record of the first one time password is immutable.

14. The method of claim 9, wherein generating the second one time password is further based on identifying that a trust score corresponding to the first device exceeds a predetermined threshold, wherein the trust score is generated based on a percentage of one time passwords, sent after an initial password and a determination that the period of time has been exceeded, that have been returned to the computing platform from the first device and successfully validated.

15. The method of claim 9, further comprising:

sending, to the first device, a notification indicating that the event was processed and one or more commands directing the first device to display the notification indicating that the event was processed, wherein sending the one or more commands directing the first device to display the notification indicating that the event was processed causes the first device to display the notification indicating that the event was processed and that the second one time password was validated using the distributed ledger.

16. The method of claim 11, wherein processing the event comprises executing a transaction.

17. One or more non-transitory computer-readable media storing instructions that, when executed by a computing platform comprising at least one processor, a communication interface, and memory, cause the computing platform to perform a blockchain based method to conserve processing power and network bandwidth when accounting for missing one time passwords, the blockchain based method comprising:

receiving an event processing request;

generating a first one time password;

recording the first one time password in a distributed ledger, by adding a new entry to the distributed ledger that includes the first one time password, and wherein the distributed ledger:

is configured to enable smart contracts for event processing requests, comprises a sequential structure of blocks each storing one of the event processing requests, wherein the event processing requests are sequential in nature and time scale, comprises one of: a private blockchain or a public blockchain, wherein the public blockchain is encrypted using Rivest-Shamir-Adleman;

sending the first one time password to a first device, wherein the first device is operating on a disrupted cellular network, and wherein the disrupted cellular network prevents receipt of the first one time password by the first device;

identifying that a period of time has elapsed since sending the first one time password to the first device and that the first one time password has not been received at the computing platform from the first device;

identifying that the period of time exceeds a threshold time period;

in response to determining that the period of time exceeds the threshold time period:

generating a second one time password;

recording the second one time password in the distributed ledger;

sending the second one time password to the first device, wherein the first device is configured to:

present an interface prompting for the second one time password to be entered, wherein presenting the interface comprises redirecting the first device from a first website hosted by an enterprise server to a second website hosted by the computing platform, and receive, via the interface and from a user of the first device, input of the second one time password, wherein receipt of the input of the second one time password causes, based on the redirection of the first device from the first website hosted by the enterprise server to the second website hosted by the computing platform, the second one time password to be communicated to the computing platform;

validating, using the distributed ledger and based on the redirection of the first device from the first website hosted by the enterprise server to the second website hosted by the computing platform, the second one time password, wherein validating the second one time password comprises performing a multi-party validation of the second one time password by the user, an enterprise corresponding to the enterprise server, and an enterprise corresponding to the computing platform;

recording, in the distributed ledger, validation information indicating that the second one time password was validated; and processing, based on validating the second one time password using the distributed ledger, an event corresponding to the event processing request.

18. The one or more non-transitory computer-readable media of claim 17, wherein the first device is a customer computing device and a second device is a merchant computing device.

19. The one or more non-transitory computer-readable media of claim 18, wherein the first device and the second device correspond to a common entity.

20. The one or more non-transitory computer-readable media of claim 18, wherein the memory stores additional computer-readable instructions that, when executed by the at least one processor, cause the computing platform to:

receive a second event processing request;

generate a third one time password;

record the third one time password in the distributed ledger;

send the third one time password to the second device;

receive, from the first device, the third one time password, wherein the third one time password was sent from the second device to the first device;

validate, using the distributed ledger, the third one time password;

record, in the distributed ledger, additional validation information indicating that the third one time password was validated; and record, in a new entry of the distributed ledger, the validation information and the additional validation information.

* * * * *